United States Patent
Hasegawa et al.

[11] Patent Number: 5,906,697
[45] Date of Patent: May 25, 1999

[54] ADHESIVE AGENT FOR A VEHICULAR GLASS AND METHOD FOR MOUNTING THE GLASS ONTO A VEHICLE BODY

[75] Inventors: Kiyoshi Hasegawa; Katsuhiro Shibata, both of Wako, Japan

[73] Assignee: Honda Giken Kogyo Kabushiki Kaisha, Tokyo, Japan

[21] Appl. No.: 08/968,978

[22] Filed: Nov. 12, 1997

[30] Foreign Application Priority Data

Dec. 9, 1996 [JP] Japan .................................... 8-328610

[51] Int. Cl.[6] .................................. B60J 1/00; B60J 10/02
[52] U.S. Cl. .......................... 156/108; 156/71; 156/331.7; 156/327; 296/84.1; 296/93; 296/201; 52/208
[58] Field of Search ..................... 156/108, 293, 156/331.7, 327, 71; 296/93, 84.1, 201; 52/208

[56] References Cited

U.S. PATENT DOCUMENTS

| | | |
|---|---|---|
| 4,555,607 | 11/1985 | Roentgen et al. . |
| 4,808,255 | 2/1989 | Markevka et al. . |
| 4,986,867 | 1/1991 | Braendle et al. . |
| 5,155,180 | 10/1992 | Takada et al. . |
| 5,441,808 | 8/1995 | Anderson et al. . |
| 5,639,136 | 6/1997 | Rusch et al. . |

*Primary Examiner*—Sam Chuan Yao
*Attorney, Agent, or Firm*—Merchant, Gould, Smith, Edell, Welter & Schmidt, P.A.

[57] ABSTRACT

An adhesive for a vehicular glass is disclosed which comprises urethane as a base material added with 2% to 8% by weight of a thermoplastic resin. The thermoplastic resin may be a polyester-based resin. The adhesive is heated to a temperature of 60° C.–80° C. and then applied to a peripheral edge of a windshield. The windshield is sucked by a suction cup and pressed against a window frame of a vehicle body. Thereafter, the adhesive is cooled by blowing air having a temperature on the order of 20° C. thereat. The adhesive is forcibly cooled down to 50° C. or lower in a short time, thereby exhibiting temporary retention property.

5 Claims, 4 Drawing Sheets

ADHESIVE AGENT FOR A VEHICULAR GLASS AND METHOD FOR MOUNTING THE GLASS ONTO A VEHICLE BODY

BACKGROUND OF THE INVENTION

1. Field of the Invention

The present invention relates to an adhesive agent for mounting a peripheral edge of a windshield or a rear window glass onto a vehicle body, and a method for mounting such a glass on the vehicle body by using the adhesive agent.

2. Description of the Related Art

A typical method for mounting a relatively heavy windshield or a rear window glass (hereinafter referred to as "glass sheet") onto a vehicle is described hereinbelow.

One of male and female members of a hook- and loop-type fastener is attached to a glass sheet while the other fastener member capable of locking engagement with the one fastener member is attached to a window frame into which the glass sheet is to be fitted. An adhesive is then applied to the glass sheet or window frame, whereafter the glass sheet is hand-carried closely to the window frame for confirming the position of mount thereof. If the glass sheet is found to be correctly positioned, the one fastener member on the glass sheet is brought into locking engagement with the companion fastener member on the window frame. This condition is held until the adhesive becomes hardened. Once the adhesive becomes hardened, the glass plate is held on a vehicle body by the retention force or adhesive strength of the adhesive. This means that the hook- and loop-type fastener is a temporary fastening used for temporarily holding the glass sheet on the vehicle body until a sealer becomes hardened. Pins and holders also may be employed as the temporary fastening.

However, use of the temporary fastening such as the hook- and loop-type fastener brings about problems as enumerated below:

(1) it is difficult to automate a series of operations of hand-carrying the glass sheet closely to the window frame for confirming the mount position thereof and thereafter bringing the one fastener member on the glass sheet into locking engagement with the companion fastener member on the window frame and hence these operations are presently performed manually; and (2) the temporary fastening such as the hook- and loop-type fastener obstructs replacement of the glass sheet.

SUMMARY OF THE INVENTION

In a research to solve the foregoing problems, the present inventors have realized that by sufficiently increasing the pre-hardening adhesive strength of an adhesive, it becomes possible to mount a glass sheet directly onto a window glass without using a conventional temporary fastening. Continued research and associated experiments have produced a favorable result. This has led to the present invention.

According to a first aspect of the present invention, there is provided an adhesive for a vehicular glass, which comprises urethane as a base material added with 2–8% by weight of a thermoplastic resin.

The adhesive mixture thus prepared has an increased temporary retention force. As a result, the glass sheet can be mounted directly onto the window frame by the adhesive only, without the use of the temporary fastening such as fasteners and clips. Consequently, the glass sheet mounting operations can be performed more efficiently and automatically using a robot. Moreover, since no temporary fastenings remain on the glass sheet and window frame, the sheet glass can be replaced easily.

Desirably, the thermoplastic resin is a polyester-based resin. The polyester-based resin is advantageous in that since it has a melting point of 50° C. to 70° C., it does not need to be heated so much and can be handled with easy.

According to a second aspect of the present invention, there is provided a method for mounting a peripheral edge of a windshield or a rear window glass of a vehicle onto a vehicle body. The method comprises the steps of: applying an adhesive mixture, formed by adding 2% to 8% by weight of a thermoplastic resin to urethane as a base material and heated to 60° C.–80° C., to the peripheral edge of either the glass or a window frame of the vehicle body; applying suction to the glass and pressing it against the window frame; and cooling the adhesive with air.

In the illustrated embodiment, the air used for cooling the adhesive has a temperature on the order of 20° C. By blowing the air, the adhesive is forcibly cooled down to 50° C. or lower in a short period of time, thereby exhibiting temporary glass retention capabilities.

BRIEF DESCRIPTION OF THE DRAWINGS

Certain preferred embodiments of the present invention will now be described in detail, by way of example only, with reference to the accompanying drawings, in which.

DETAILED DESCRIPTION OF THE PREFERRED EMBODIMENTS

The following description is merely exemplary in nature and is in no way intended to limit the invention or its application or uses.

Figure 1:
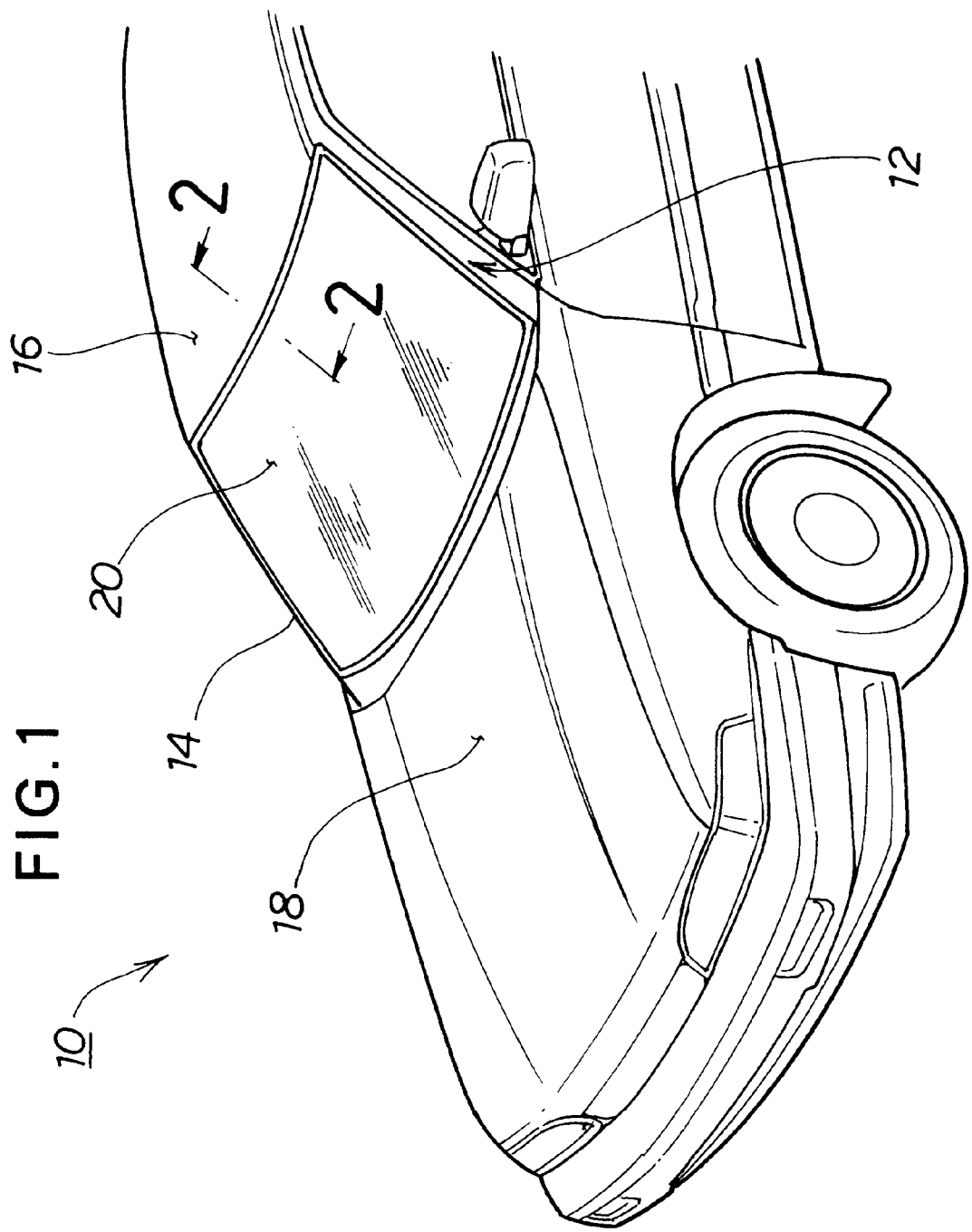
FIG. 1 is a perspective view showing a windshield mounted to a vehicle body in accordance with the present invention.

Referring to FIG. 1, a vehicle 10 includes at a front part thereof a windshield front glass 20 mounted in an opening defined by right and left front pillars 12, 14, a roof 16 and a hood 18.

Figure 2:
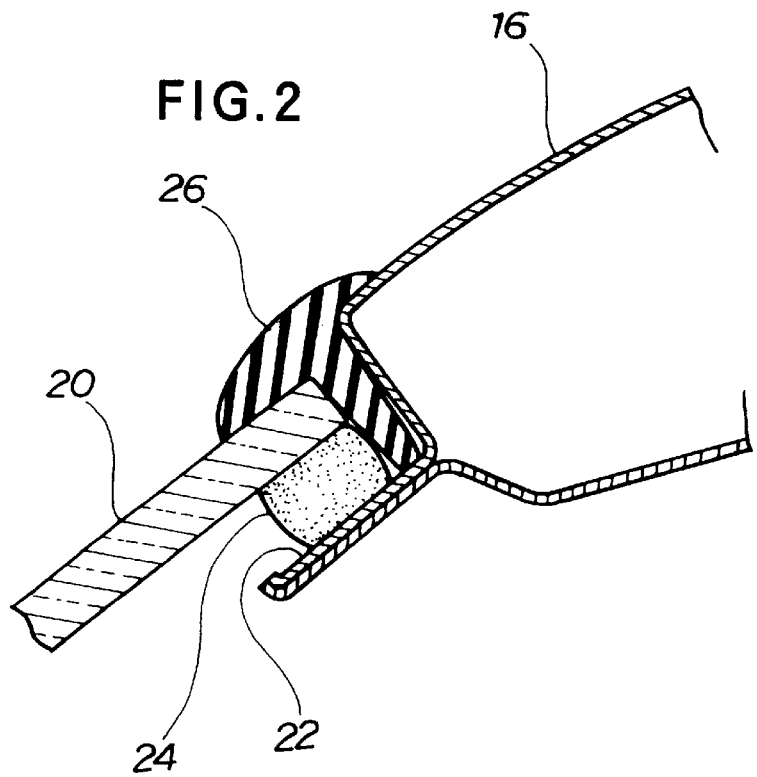
FIG. 2 is an enlarged cross sectional view taken along line 2—2 of FIG. 1.

Turning to FIG. 2, the windshield 20 is connected at a peripheral edge thereof to a window frame 22 formed by a front edge of the roof 16 by means of an adhesive 24.

The adhesive 24 will now be described in detail below.

The adhesive agent 24 consists essentially of urethane as a base material added with 2%–8% by weight of a thermoplastic resin. The thermoplastic resin is a crystalline resin which serves to increase a creep resistance of the adhesive agent 24. Preferably, the thermoplastic resin is a polyester-based resin which is quick in crystallization and has a melting point of 50° C. to 70° C. If the adhesive agent is slow in crystallization, it becomes necessary to press support the windshield 20 until the retention force of the adhesive increases. This is the problem experienced in the prior art. Conversely, if the adhesive quickly crystallizes, the retention force increases in a short time, and the windshield can thus be held on the vehicle body without using any temporary fastenings such as hook and loop fasteners. Again, if the melting point is too high, this will require a large-scale heating installation, thereby consuming a large quantity of heat energy. Thus, the melting point of 50° C. to 70° C., which is slightly higher than a normal temperature, is desirable.

Figure 3:
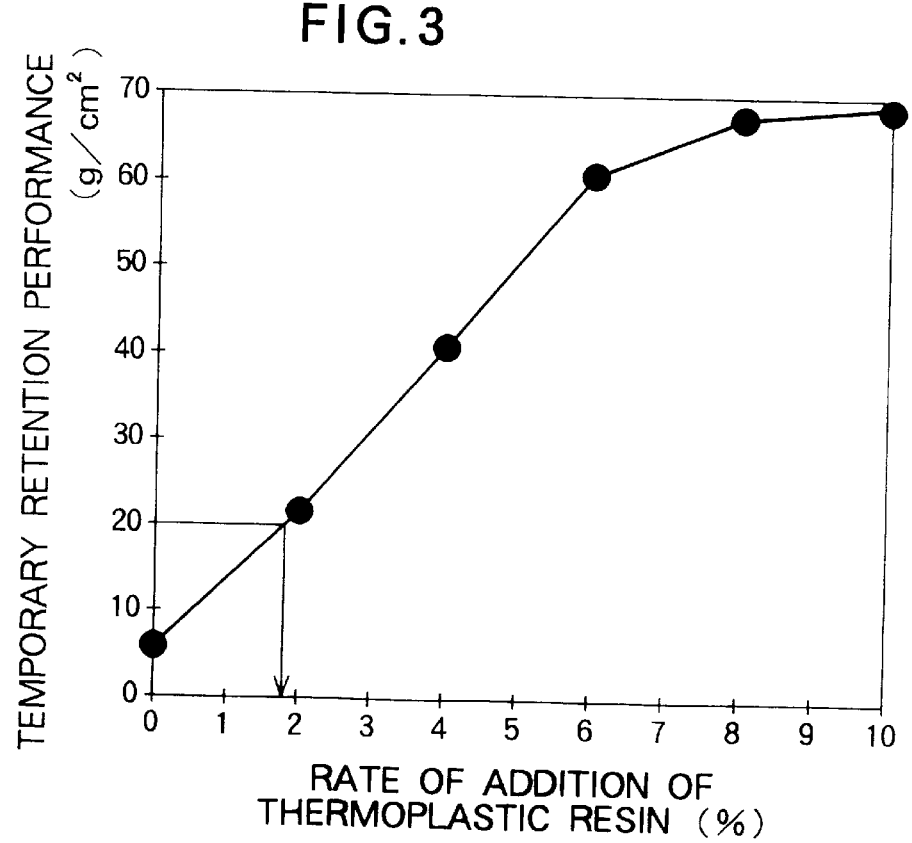
FIG. 3 is a graph showing the temporary retention property of an adhesive according to the present invention.

Reference is now had to FIG. 3 which is a graph showing the temporary retention performance of the adhesive in accordance with the present invention. In the graph, the horizontal axis shows a rate (%) of addition of the thermoplastic resin to the urethane while the vertical axis shows the temporary retention performance or force (g/cm$^2$).

The temporary retention performance is obtained by measuring, in accordance with the below-described procedure, a strength per unit area of an adhered surface immediately after the windshield is press held against the vehicle body with the adhesion interposed therebetween.

In the graph, ● (solid circle) represents a measurement. As can be appreciated, the temporary retention force of urethane alone is approximately 7 g/cm$^2$. As the urethane is used as a base material and 2% of a thermoplastic resin is added thereto, it exhibits a temporary retention force of 22 g/cm$^2$. When 4% of a thermoplastic resin is added to the urethane as a base material, the resultant temporary retention force is 42 g/cm$^2$. Similarly, addition of 10% thermoplastic resin produces a temporary retention force of 68 g/cm$^2$. This means that the temporary retention force increases in proportionate to the rate of addition of a thermoplastic resin.

Windshields currently put to practical uses weigh about 1 kg to 17 kg. For attaching such windshields to vehicle bodies, a bonding area of approximately 350 cm$^2$ will be required. For supporting the windshield by the adhesive alone, a temporary retention force of at least 18 g/cm$^2$ is necessary in the light of an angle of attachment of the windshields. In practical uses, a minimum temporary retention force may desirably be 20 g/cm$^2$ for the sake of safety. As can be appreciated from the graph, the temporary retention force of 20 g/cm$^2$ can be achieved by addition of 2% or more of the thermoplastic resin.

Figure 4:
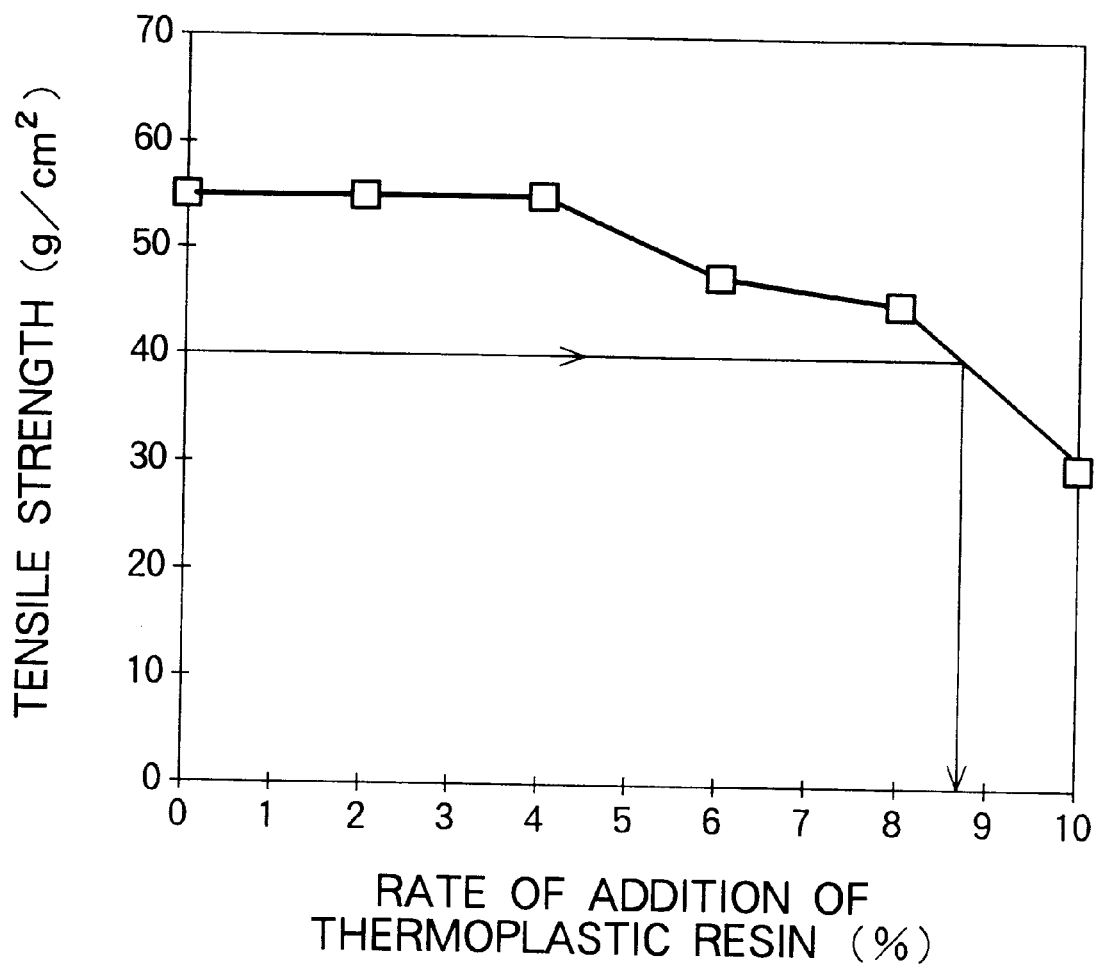
FIG. 4 is a graph showing the tensile strength of the adhesive according to the present invention.

Reference is next made to FIG. 4 which graphically shows the tensile strength of the adhesive in accordance with the present invention. In the graph, the horizontal axis shows a rate (%) of addition of a thermoplastic resin to urethane while the vertical axis shows the tensile strength of the adhesive kg/cm$^2$.

Measurements were made of the tensile strength of the adhesive seven days after application thereof. The tensile strength is given in a unit different from that of the temporary retention performance but is equivalent to about one thousand times the temporary retention performance.

In the graph, □ (open square) represents a measurement. It will be appreciated that the tensile strength of urethane alone is approximately 56 kg/cm$^2$. When urethane is used as a base material and 6% of a thermoplastic resin is added thereto, the tensile strength is 48 kg/cm$^2$. Addition of 8% of a thermoplastic resin produces the tensile strength of 46 kg/cm$^2$. The tensile strength of 30 kg/cm$^2$ is exhibited when 10% of a thermoplastic resin is added to urethane. This means that the tensile strength decreased in proportionate to the rate of addition of a thermoplastic resin.

The larger the bonding strength of the adhesive is, the better. From a practical point of view, a minimum required strength is 40 kg/cm$^2$. As shown in the graph, this strength is provided by limiting the rate of addition of a thermoplastic resin to 8%.

As is apparent from the foregoing discussion, the required temporary retention performance and tensile strength can be obtained by the addition of 2–8% by weight of a thermoplastic resin to a urethane base.

Next, discussion will be made as to the mode of mounting the windshield onto the vehicle by means of the adhesive according to the present invention.

Figure 5A:
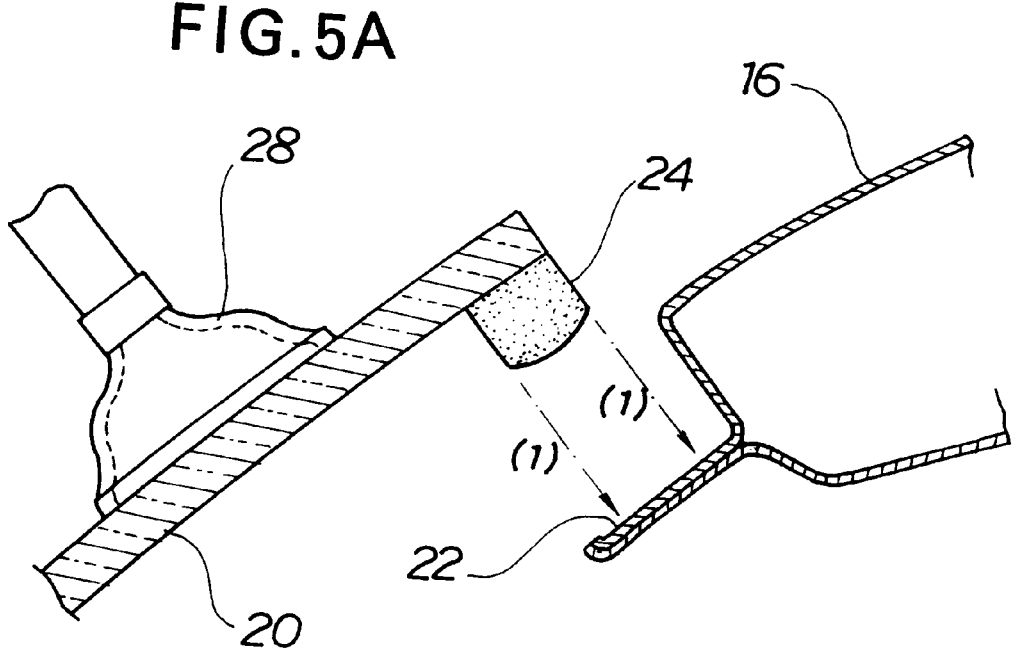
FIG. 5A and FIG. 5B are views showing how the windshield is mounted onto the vehicle body by using the adhesive according to the present invention.
Figure 5B:
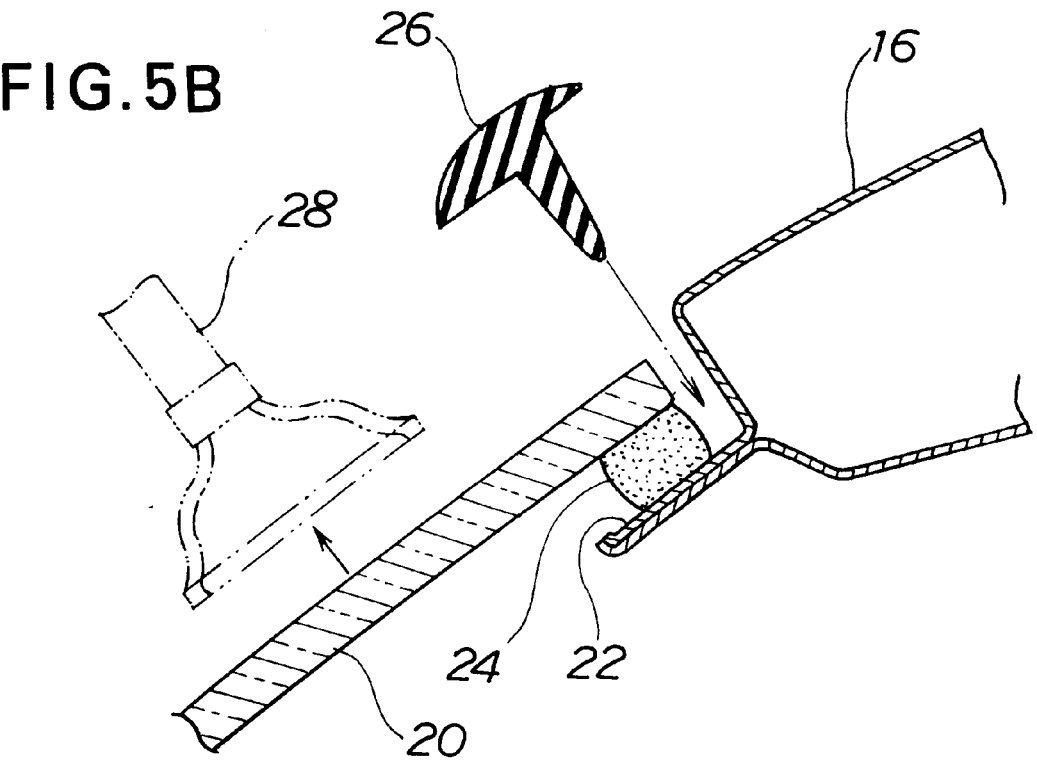

FIGS. 5A and 5B illustrates how the windshield is mounted to the vehicle body.

In FIG. 5A, the adhesive 24 heated to a temperature of 60° C. to 80° C. is applied to the peripheral edge of the windshield 20. Then, the windshield 20 is sucked by a suction cup 28 attached to a robot hand (not shown), moved to the front part of the vehicle and press held against the window frame 22 as shown by arrows (1), (1).

In FIG. 5B, air on the order of 20° C. is blown against the adhesive 24 through an air nozzle not shown. As a result, the adhesive 24 is forcibly cooled down to a temperature of lower than 50° C. in a short time, thereby exhibiting the temporary retention performance as shown in FIG. 3. Then, the suction cup 11 is removed, followed by press mounting a molding 26.

With this arrangement, there is no longer any concern over the windshield 20 accidentally coming off of the vehicle body during assembly operations. Further, since the bonding strength of the adhesive increases as time lapses, it is unlikely that the windshield 6 will be displaced during the operations.

The above-described mounting process is given by way of an example only, and other mounting processes are also possible. For example, the adhesive 8 may alternatively be applied to the window frame 7, and the windshield 20 is press held against the window frame.

It may be readily appreciated by those skilled in the art that the present invention can be employed in mounting a rear window glass.

Obviously, various minor changes and modifications of the present invention are possible in the light of the above teaching. It is therefore to be understood that within the scope of the appended claims, the present invention may be practiced otherwise than as specifically described.

What is claimed is:

1. A method for mounting a peripheral edge of a windshield and/or a rear window glass of a vehicle onto a vehicle body, comprising the steps of:

applying an adhesive mixture, formed by adding 2–8% by weight of a thermoplastic polyester resin to urethane as a base material and heated to a temperature of 60° C.–80° C., to said peripheral edge of either said glass or a window frame of said vehicle body;

applying suction to said glass and pressing said glass against said window frame; and cooling said adhesive with air.

2. A method according to claim 1, wherein said cooling step is performed by blowing air having a temperature on the order of 20° C. at said adhesive.

3. A method according to claim 1, further including the steps of:

terminating the sucking to release said glass; and inserting a molding into a gap defined between said glass and said window frame.

4. A method according to claim 1, wherein said thermoplastic resin is crystalline.

5. A method according to claim 1, wherein the suction is applied by a suction cup attached to a robot member and the window is pressed against the window frame by the robot member.

* * * * *